(12) United States Patent
Holler

(10) Patent No.: US 6,741,922 B2
(45) Date of Patent: May 25, 2004

(54) ANTILOCK BRAKING SYSTEM BASED ROLL OVER PREVENTION

(75) Inventor: Gusztav Holler, Elyria, OH (US)

(73) Assignee: Bendix Commercial Vehicle Systems LLC

( * ) Notice: Subject to any disclaimer, the term of this patent is extended or adjusted under 35 U.S.C. 154(b) by 0 days.

(21) Appl. No.: 10/158,294

(22) Filed: May 30, 2002

(65) Prior Publication Data

US 2003/0225499 A1 Dec. 4, 2003

(51) Int. Cl.$^7$ .................. G01D 21/00; F02D 29/02; B60R 21/13
(52) U.S. Cl. .................. 701/71; 701/38; 340/438
(58) Field of Search .................. 701/71, 38, 90, 701/110, 45, 70, 72, 79, 80; 280/5.506, 755; 340/438, 439, 440; 303/182, 191; 180/282

(56) References Cited

U.S. PATENT DOCUMENTS

| 5,491,418 | A |   | 2/1996  | Alfaro et al. ............ 324/402 |
| 5,825,284 | A | * | 10/1998 | Dunwoody et al. ....... 340/440 |
| 6,081,761 | A | * | 6/2000  | Harada et al. ........... 701/72 |
| 6,114,952 | A |   | 9/2000  | Francesangeli et al. ... 340/453 |
| 6,170,594 | B1| * | 1/2001  | Gilbert ................. 180/282 |
| 6,315,373 | B1| * | 11/2001 | Yamada et al. .......... 303/191 |
| 6,498,976 | B1| * | 12/2002 | Ehlbeck et al. ......... 701/70 |
| 6,542,073 | B2| * | 4/2003  | Yeh et al. .............. 340/440 |
| 6,560,519 | B2| * | 5/2003  | Williams et al. ........ 701/45 |
| 2002/0095244 | A1 |   | 7/2002  | Rhode et al. |

FOREIGN PATENT DOCUMENTS

| DE | 199 04 216 A1 | 1/2000 |
| DE | 101 57 976 A  | 6/2002 |
| EP | 1 110 834 A2  | 6/2001 |
| WO | WO 03/008242 A1 | 1/2003 |

* cited by examiner

Primary Examiner—Tan Q. Nguyen
Assistant Examiner—Dalena Tran
(74) Attorney, Agent, or Firm—Calfee, Halter & Griswold LLP

(57) ABSTRACT

A rollover prevention system for a vehicle includes an antilock braking system and a plurality of wheel-end modulator valves associated with respective wheels. The antilock braking system includes an electronic control unit and a lateral acceleration estimator for determining a lateral acceleration of the vehicle. The wheel-end modulator valves cause respective braking pressures to be applied at the respective wheels as a function of the lateral acceleration of the vehicle and a level of frictional contact between the wheels and a driving surface.

25 Claims, 6 Drawing Sheets

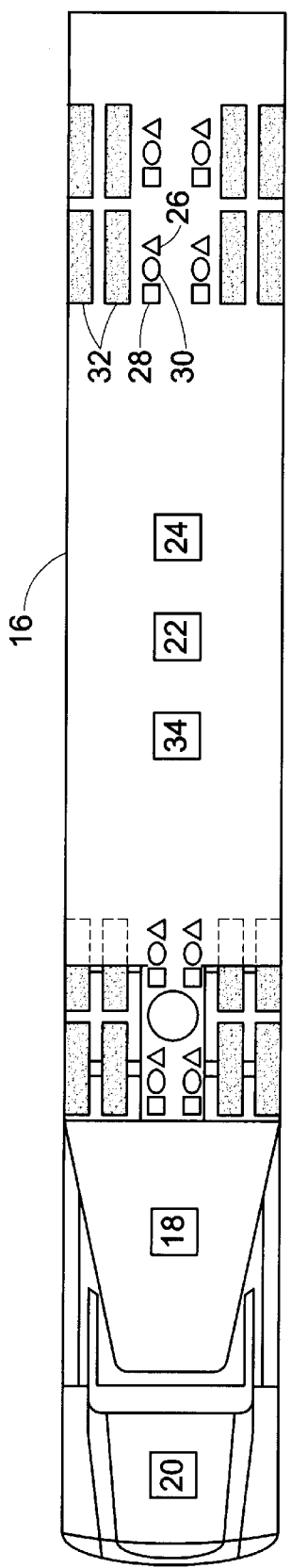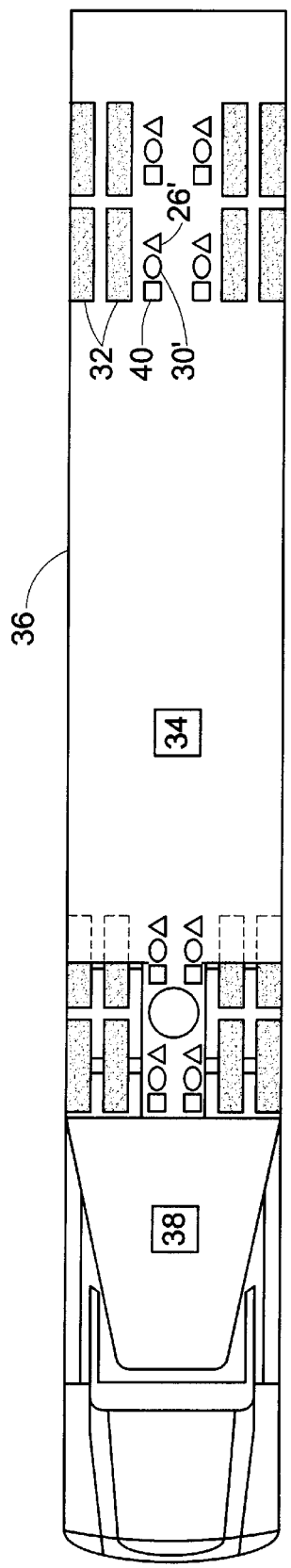
FIG. 2 (PRIOR ART)
FIG. 3 (PRIOR ART)

ANTILOCK BRAKING SYSTEM BASED ROLL OVER PREVENTION

BACKGROUND OF THE INVENTION

This invention relates in general to a rollover prevention system for a heavy duty tractor trailer combination. More specifically, the invention incorporates a rollover prevention algorithm into an antilock braking system (ABS).

Approximately fifty-five percent of all fatalities for operators of tractor-trailer combination vehicles occur in rollover accidents. Rollover can easily occur if the vehicle operator underestimates the speed of the vehicle when entering a corner. In the initial stages of a vehicle rollover condition, one or more wheels of the vehicle lifts off the ground. However, this wheel lift is almost imperceptible to the operator until it is too late (e.g., the vehicle begins to actually rollover) for the operator to reverse the process and prevent an accident.

The main factors which contribute to the rollover of a turning vehicle are vehicle speed, road curvature, position of center of gravity, and tire/road adhesion. Dynamic effects, such as a change in the position of the center of gravity and nonlinear behavior due to a moving load such as a liquid or livestock may also be significant factors. Vehicles with a high center of gravity, such as long haul trucks and tractor-trailer combinations, are particularly susceptible to rollover while cornering at relatively moderate speeds.

FIG. 1 illustrates physical forces that act on a vehicle 10 to cause rollover. The vehicle has a center of gravity (cg), and the height of the center of gravity ($h_{cg}$) is the distance between the point cg and the ground. During steady cornering, lateral or sideways acceleration occurs, and the vehicle is influenced by a downward force (mg) due to gravity and a lateral force ($ma_{LAT}$) due to lateral acceleration. When the vehicle 10 is at rest or traveling in a straight line, the downward force is substantially equally distributed between wheels 12, 14 at each axle as wheel load, which equals the normal force ($F_{N1}$) ($F_{N2}$). During cornering, however, lateral acceleration causes a sideways imbalance between the wheels 12 (e.g., inner wheels) and the wheels 14 (e.g., outer wheels) due to forces ($\Delta F_{N1}$) and ($\Delta F_{N2}$) that change the wheel load at each axle. The sideways imbalance force $\Delta F_N$ depends on several parameters such as torsional stiffness and curve radius, which may be approximated as a constant C. Consequently, the sideways imbalance force $\Delta F_N$ may be calculated according to the following equation:

$$\Delta F_N = C^* h_{cg}^* a_{LAT}.$$

As the lateral acceleration increases, the sideways imbalance force $\Delta FN$ reduces the downward wheel load on the inner wheels 12, and increases the downward wheel load on the outer wheels 14. If the lateral acceleration exceeds a safe level, the inner wheel load is reduced to zero and the vehicle 10 rolls over. Rollover avoidance measures include reducing speed, lessening lateral force components, and changing vehicle suspension parameters such as damper stiffness or air-bag inflation.

To enhance operator safety, brake system manufacturers offer rollover prevention (ROP) systems. In conventional ROP systems, the determination as to when an unstable condition is imminent is made by monitoring lateral acceleration. If necessary, the brakes are automatically applied to immediately reduce vehicle speed—and thus lateral acceleration—to improve the vehicle's stability. ROP systems are classified as either passive (warning only) or active (automatic intervention) systems.

An ROP system monitors a tractor-trailer combination vehicle from either the tractor or the trailer. A system which observes only the tractor has the advantage of being compatible with virtually any trailer. The drawback, however, is that an impending rollover of the trailer is difficult to detect from the tractor. For example, a flatbed trailer has a flexible frame. In this case, prior to an impending rollover, the wheels of the trailer that leave the ground first are on the inside of the curve (i.e., the inner wheels), while the wheels of the tractor that leave the ground first are on the outside of the curve (i.e., the outer wheels). A box style trailer, on the other hand, has a rigid frame. In this case, prior to an impending rollover, the trailer causes the inner wheels of the tractor's driven axle to also leave the ground first.

Three major directions of ROP system development are: i) tractor-based ROP; ii) trailer-based ROP; and iii) position monitoring ROP. Each of these types of ROP systems is discussed below in greater detail.

In a tractor-based ROP system, one or more sensors are located on the tractor, and output(s) of the tractor mounted sensors are utilized for estimating lateral acceleration of the trailer. If the estimated lateral acceleration exceeds a predetermined level, a test braking pressure is applied to the trailer. The test pressure is a moderate level of braking automatically applied to the trailer through the tractor's trailer brake control proportioning valve. ROP logic determines whether one of more of the trailer's wheels does not have firm contact with the road surface. More specifically, if the application of the test pressure locks the trailer's wheels, it is determined via the ROP logic that the wheel(s) have little or no contact with the road surface, and therefore the trailer's ABS is activated. A current sensor mounted on the tractor detects when wheel-end modulator valves mounted on the trailer are activated as a function of additional electric power consumed by the trailer. In this case, the ROP system triggers an automatic brake application for the tractor-trailer combination.

The tractor-based approach has several disadvantages. For example, the reaction time of such systems is relatively slow, which occurs due to a time lag while air pressure builds on the trailer. Furthermore, tractor-based systems require a current sensor on the tractor to sense the trailer's power consumption, an electronic braking system (EBS) installed on the tractor, and an ABS installed on the trailer. In addition, tractor-based ROP is not a satisfactory solution for box trailers, which have a rigid frame, since, as discussed above, the tractor's driven axle is lifted off the ground by the trailer before the trailer's wheels are lifted off the ground. Thus, by the time the ROP system detects that the trailer's wheels are lifted off the ground, it is too late to prevent the rollover event.

Trailer-based ROP works similar to the tractor-based variant. One or more sensors are located on the trailer. Lateral acceleration of the trailer is estimated as a function of signals output from the sensors. If the estimated lateral acceleration of the trailer exceeds a predetermined level, a test braking pressure is applied to the trailer's inner wheels and ABS activity is monitored. In case of wheel locking, which is a sign of lifted wheels and impending rollover, a full trailer brake application is initiated by the ROP system for preventing a rollover. If an appropriate data link with the tractor exists, the operator may be warned as well.

Although trailer-based ROP systems do not require interaction with the tractor, such systems may not perform acceptably when used with some rigid-body semi-trailers and, furthermore, may require additional hardware to interface with certain EBSs on the trailer.

Position monitoring ROP calculates the trailer's roll angle using a roll rate sensor. Data from such a sensor, when combined with the speed and lateral acceleration, indicate whether any further increases in speed or lateral acceleration could lead to a rollover. This method involves previously known trailer specific structural/dynamic information. The knowledge of exact vertical position as a result of integration of the roll rate sensor is crucial. Once an impending rollover scenario is detected, the ROP system initiates brake application on the trailer or another appropriate counter step(s) (e.g., changing the trailer suspension's characteristics to inhibit rollover).

One advantage of position monitoring ROP is that it does not require any automatic brake application for the detection (i.e., no test braking pressure is applied). However, such systems also require additional hardware to be associated with a trailer EBS for generating automatic trailer brake application.

Because ABS is merely an improvement upon conventional mechanical braking system, ABS does not provide ROP capabilities. Therefore, all three of the conventional types of ROP discussed above must be hosted by an EBS, which is also referred to as a "brake by wire" system.

A "brake by wire" system (e.g., EBS) utilizes electronic signals to control braking. More specifically, the electronic signals are used in place of fluid (e.g., air) signals to activate the brakes once a brake pedal is depressed. FIG. 2 constitutes a plan view of a vehicle 16 equipped with conventional EBS. The vehicle 16 includes the following components: an EBS electronic control unit ("ECU") 18, a brake pedal position sensor 20, a load sensor 22, a lateral acceleration sensor 24, a wheel speed sensor 26, and a pressure control module 28. The wheel speed sensor 26, pressure control module 28, and a service brake chamber 30 are mounted at a wheel 32. It is to be understood that although only a single wheel speed sensor 26, pressure control module 28, service brake chamber 30, and wheel 32 are referenced in FIG. 2, respective components are mounted at each of a plurality of wheels. The pressure control module 28, which is capable of a continuous range from zero (0) pounds per square inch (psi) to maximum braking pressure, is located between an air supply reservoir 34 and the service brake chamber 30. The pressure control module 28 feeds air to the service brake chamber 30 and precisely controls the pressure in accordance with a control input. The EBS ECU 18 communicates with the brake pedal position sensor 20, the load sensor 22, the acceleration sensor 24, the wheel speed sensor 26, and the pressure control module 28. The EBS ECU 18 receives input signals from the brake pedal position sensor 20, wheel speed sensor 26, the load sensor 22, and the lateral acceleration sensor 24. The EBS utilizes the pressure control module 28 to electronically control a level of braking pressure applied to the wheel 32. Furthermore, the EBS ensures that when an operator presses the brake pedal, the service brake chambers 30 are triggered to immediately generate uniform braking on all axles of the vehicle 16.

FIG. 3 is a plan view of a vehicle 36 equipped with an ABS. For ease of understanding FIG. 3, like components from FIG. 2 are designated by like numerals with a primed (') suffix and new components are designated by new numerals. The vehicle 36 includes the following components: an ABS ECU 38, a wheel speed sensor 26', and a wheel-end modulator valve 40. The wheel speed sensor 26', wheel-end modulator valve 40, and a service brake chamber 30' are mounted at a wheel 32'. As in FIG. 2, it is to be understood that although only a single wheel speed sensor 26', wheel-end modulator valve 40, service brake chamber 30', and wheel 32' are referenced in FIG. 3, respective components are mounted at each of a plurality of wheels. The wheel-end modulator valve 40 communicates with the service brake chamber 30', and the ABS ECU 38 communicates with the wheel speed sensor 26' and the wheel-end modulator valve 40. The ABS ECU 38 receives input signals from the wheel speed sensor 26', and the ABS continuously monitors the wheel speed sensor 26' for wheel lockup. If impending wheel lockup is detected, the wheel-end modulator valve 40 corresponding to the locked wheel pulses braking pressure on and off. Once the danger of wheel lockup has ceased, the wheel-end modulator valve 40 is turned off and normal operator controlled braking is resumed.

There are significant differences between an EBS and an ABS. As discussed above, an EBS is a brake by wire system and, therefore, requires components not needed in an ABS (e.g., a brake pedal position sensor 20 and a pressure control module 28 (see FIG. 2)). Under normal operating conditions, the EBS provides braking in response to a signal from the operator's foot brake. However, the EBS may over-ride the operator's control signal in the event of wheel spin out, wheel skidding, or an impending rollover. An EBS always controls the braking pressure at each wheel, whereas an ABS does not normally control braking pressure. ABS does not require a brake pedal position sensor and utilizes wheel-end modulator valves instead of pressure control modules. Although an ABS continuously monitors wheel speeds, such a system is passive unless impending wheel lock is detected. The wheel-end modulator valves of an ABS are normally passive, and they are only capable of pulsing braking pressure on and off in an emergency. The pressure control modules of an EBS, on the other hand, provide constant control of braking pressure, which may be varied from zero to full brake application.

Federal Motor Vehicle Safety Standard 121 required newly manufactured trailers that are hitched to a heavy duty tractor-trailer combination to be equipped with an ABS effective March 1998. Thus, commercial vehicle fleets must conform to the requirement, and ABS equipped tractors and trailers are in common use. However, most fleets are not equipped with EBS at this point in time.

Conventional trailer ROP systems require an EBS. The additional components needed for an EBS cause such systems to be significantly more expensive than an ABS. Fleet owners do not have an incentive to bear the further cost for an EBS, merely to support a ROP system. As a result, no "global" solution for ROP currently exists. It is, therefore, desirable to add ROP capability to trucks and tractor-trailer combinations merely equipped with a conventional ABS.

SUMMARY OF THE INVENTION

In one embodiment, a rollover prevention system for a vehicle includes an antilock braking system having an electronic control unit and a plurality of wheel-end modulator valves associated with respective wheels. A lateral acceleration estimator determines a lateral acceleration of the vehicle. The wheel-end modulator valves cause respective braking pressures to be applied at the respective wheels as a function of the lateral acceleration of the vehicle and a level of frictional contact between the wheels and a driving surface.

In one aspect of the invention, if the lateral acceleration of the vehicle is greater than a predetermined entry level, the wheel-end modulator valves cause a pulsed braking pressure to be applied to the wheels having less than a predetermined level of frictional contact with the driving surface.

In another aspect of the invention, the wheels are at opposed ends of an axle. The electronic control unit determines the lateral acceleration as a function of respective velocities of the wheels and a distance between the wheels along the axle.

In another aspect of the invention, if the lateral acceleration exceeds a predetermined entry level, one of the opposed wheels is associated with an inner turning curvature of the vehicle and another one of the opposed wheels is associated with an outer turning curvature of the vehicle. One of the wheel-end modulator valves applies a pulsed braking pressure to the inner wheel.

In another aspect of the invention, if the electronic control unit determines the inner wheel locks in response to the pulsed braking pressure, the electronic control unit causes the service brake chambers to apply braking pressures to the respective wheels for slowing a rotational rate of the wheels.

In another aspect of the invention, the electronic control unit causes the service brake chambers to apply the braking pressures to the respective wheels until the lateral acceleration of the vehicle is less than a predetermined exit level.

In another embodiment of the invention, an apparatus for predicting a rollover event of a vehicle, which has an axle and a plurality of opposed wheels, includes a plurality of modulator valves associated with respective ones of the wheels and respective wheel brake chambers. A means is provided for determining a lateral acceleration of the vehicle. A means is provided for determining if any of the wheels is not in contact with a driving surface. The wheel-end modulator valves cause respective braking pressures to be applied at the wheel brake chambers if any of the wheels is not in frictional contact with the driving surface and the lateral acceleration of the vehicle exceeds a predetermined entry level.

In another embodiment of the invention, a method for preventing a rollover of a vehicle having an antilock braking system includes calculating a lateral acceleration of the vehicle. If the lateral acceleration exceeds a predetermined alert mode entry level, an electronic control unit is set to be in an alert mode. During the alert mode, a test pressure is applied to a plurality of wheels on the vehicle. Respective velocities of the wheels are monitored for determining if any of the wheels is in a lockup condition. If the lockup condition is detected for any of the wheels, a braking pressure is applied to all of the wheels.

In another embodiment of the invention, an antilock braking system includes an electronic control unit. A lateral acceleration estimator determines a lateral acceleration of the vehicle. The electronic control unit causes respective braking pressures to be applied to a plurality of wheels of a vehicle as a function of the lateral acceleration of the vehicle and a level of frictional contact between the wheels and a driving surface.

BRIEF DESCRIPTION OF THE DRAWINGS

The invention will now be described with reference to certain preferred embodiments thereof and the accompanying drawings, wherein:

FIG. 2 is a plan view of a vehicle that is equipped with a conventional EBS;

FIG. 3 is a plan view of a vehicle that is equipped with a conventional ABS;

DETAILED DESCRIPTION OF THE ILLUSTRATED EMBODIMENTS

Figure 1:
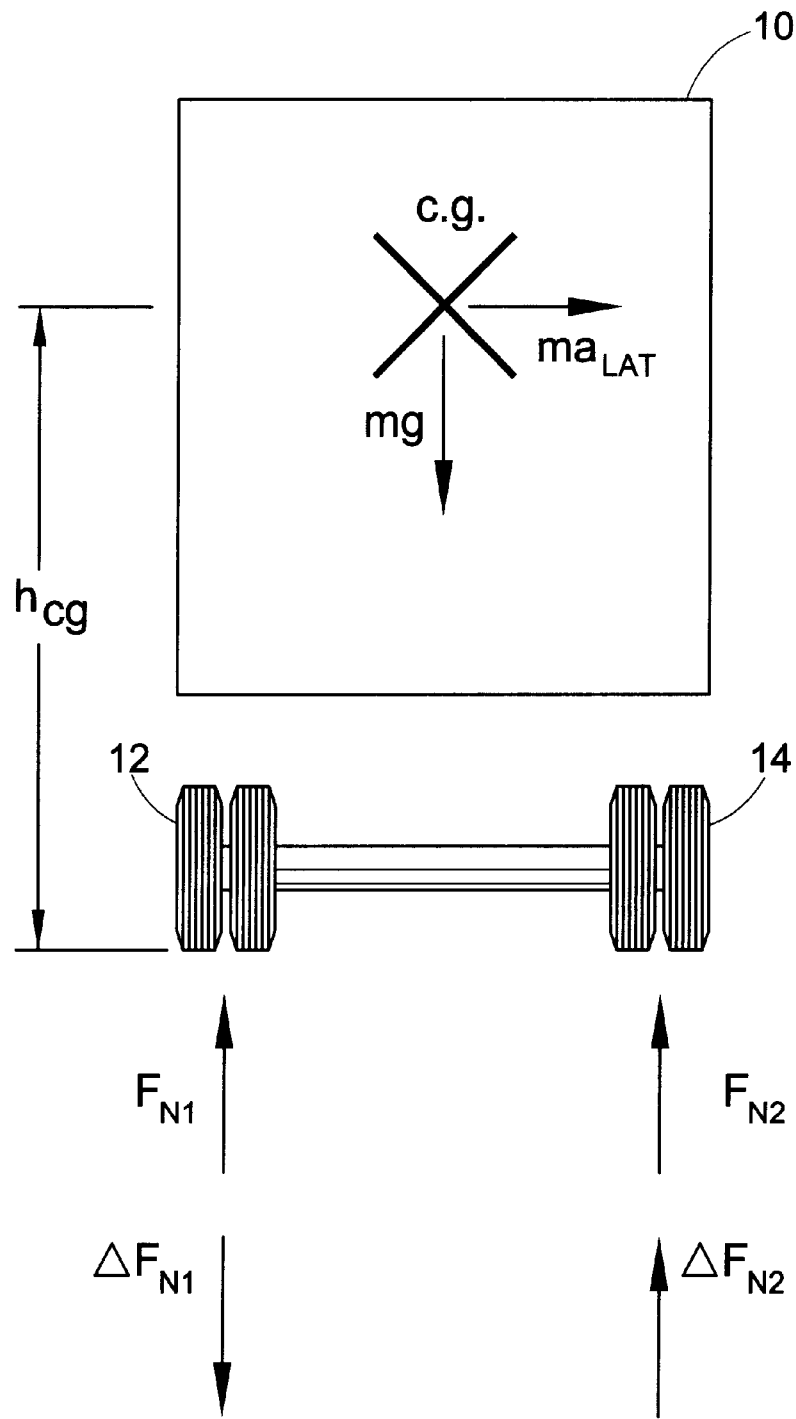
FIG. 1 is a rear view of a vehicle which diagrams the forces that contribute to vehicle rollover.
Figure 4:
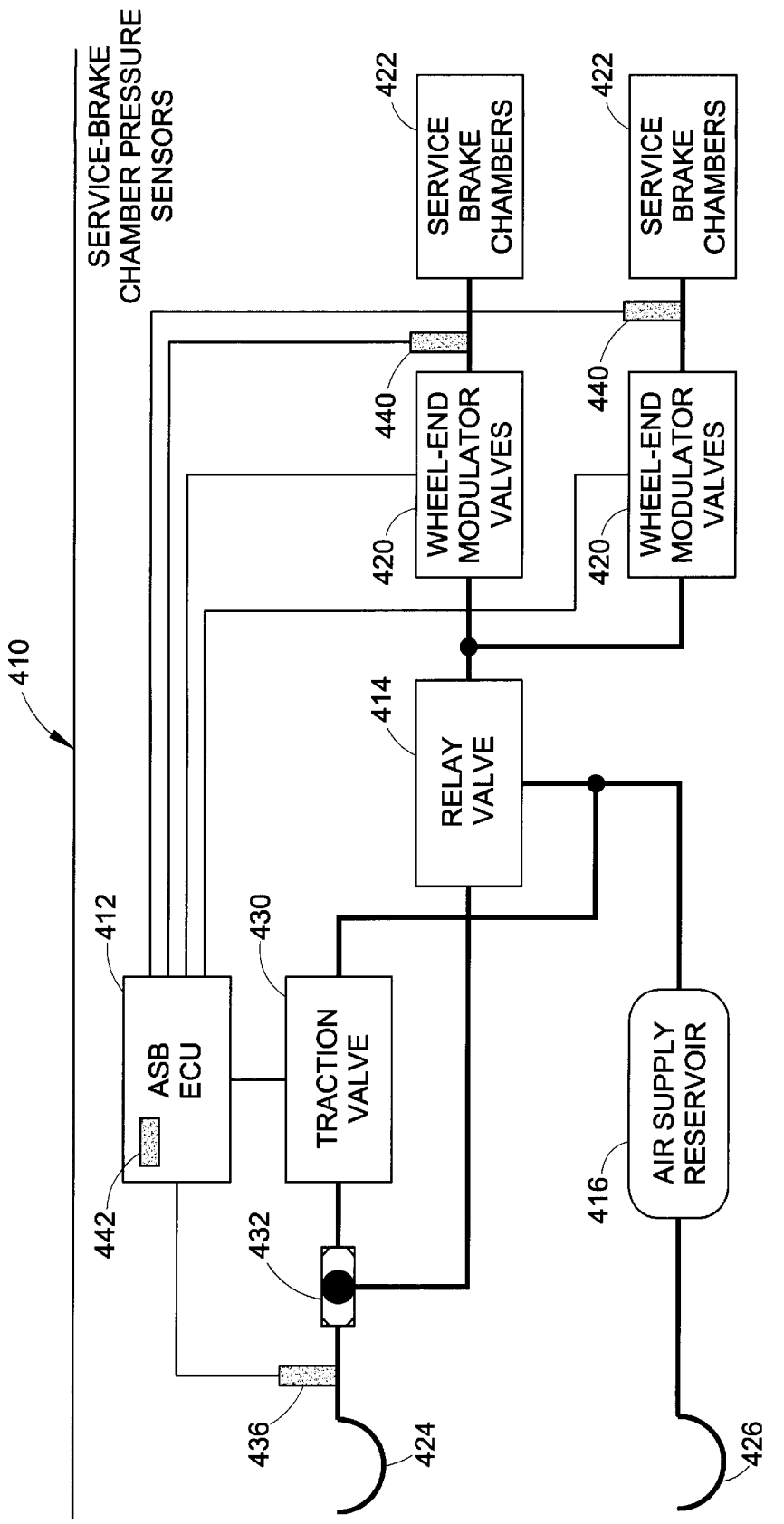
FIG. 4 illustrates a plan view of a vehicle which is equipped with a ROP system in accordance with one embodiment of the invention.

FIG. 4 illustrates a ROP system 410 in accordance with one embodiment of the present invention. The ROP system 410 incorporates an anti-lock braking system ("ABS") including an ABS electronic control unit ("ECU") with ROP 412, a relay valve 414, an air supply reservoir 416, wheel-end modulator valves 420 (with integrated relay functionality), service-brake chambers 422, control air lines 424, and supply air lines 426. FIG. 4 illustrates a configuration for a trailer with a pneumatic braking system, however, the ROP system of the present invention may also be applied to a truck or any other vehicle which is equipped with any type of ABS braking system. In addition to the ABS components, the ROP system 410 includes the following additional components: a traction valve 430, a check valve 432, a control pressure sensor 436, optional service-brake chamber pressure sensors 440, and a lateral acceleration sensor 442.

In one embodiment, the ABS ECU 412 is connected to and in communication with the control pressure sensor 436, the service-brake chamber pressure sensors 440, the wheel-end modulator valves 420, and the lateral acceleration sensor 442. The traction valve 430 is capable of supplying the full pressure of the air supply reservoir 416 to the wheel-end modulator valves 420 in the event that the ROP system 410 requires automatic emergency deceleration of the vehicle. The check valve 432 selects the highest pressure between an operator's braking demand and the traction valve 430, thereby allowing the highest brake control pressure to reach the wheel-end modulator valves 420. In this manner, the check valve 432 acts as a safety mechanism, which permits the operator to override the ROP system and brake the vehicle using a higher pressure. The control pressure sensor 436 permits the ROP system to recognize the operator's braking intention by monitoring the control air line braking pressure 424. Although the control pressure sensor 436 is disclosed as either a variable pressure sensor or a simple pressure switch, it is to be understood that other types of control pressure sensors are also contemplated.

Figure 5:
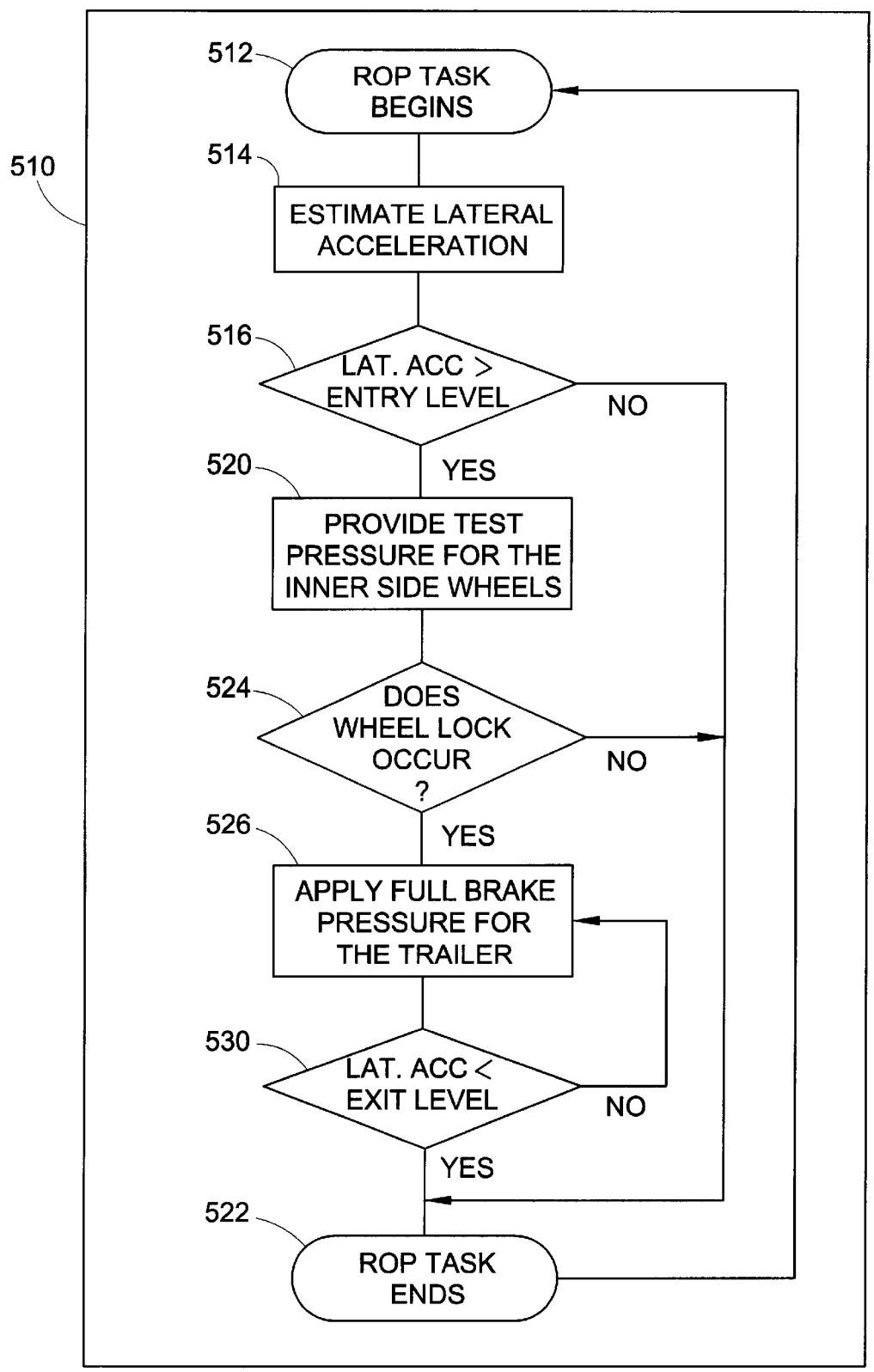
FIG. 5 is a flowchart of the ROP algorithm in accordance with one embodiment of the present invention.

Illustrated in FIG. 5 is a flowchart 510 of one embodiment of an algorithm for the ROP system 410 (see FIG. 4). During normal operation, the ROP algorithm uses the trailer control pressure sensor 436 to recognize the operator's braking command and allow the control pressure to reach the brake chambers by placing the wheel-end modulator valves 420 into a normal (load) mode. The algorithm begins in a block 512. At commencement of ROP monitoring, the vehicle's instantaneous lateral acceleration is estimated (see block 514) by monitoring one or more of the vehicle's axles. In one embodiment, the ECU 412 is used for monitoring the vehicle's axes and in this sense acts as a means for determining a lateral acceleration of the vehicle.

Figure 6:
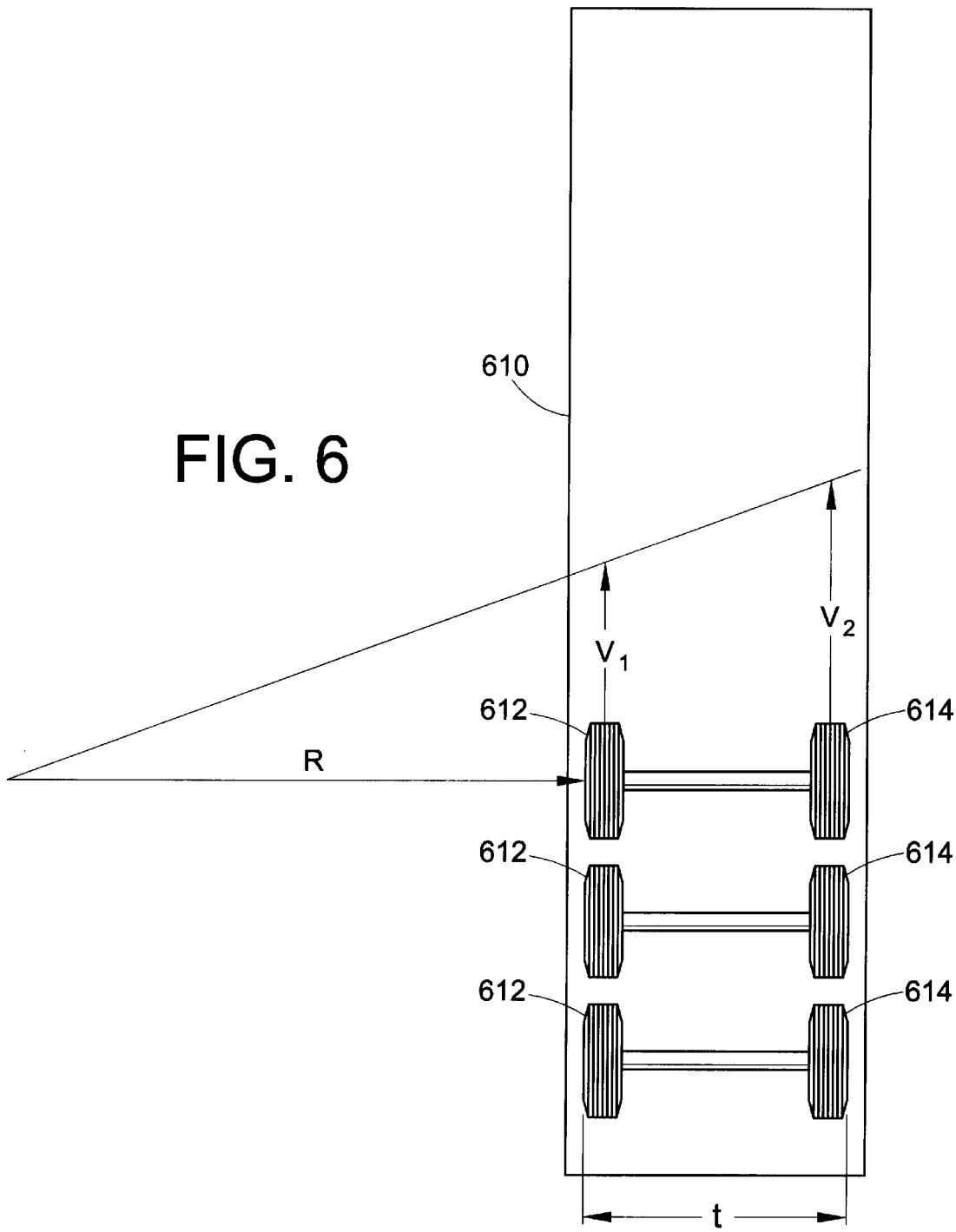
FIG. 6 is a plan view of a cornering vehicle in accordance with one embodiment of the present invention.

Illustrated in FIG. 6 is a plan view of a cornering vehicle 610, showing a relationship between an inner wheel speed (e.g., velocity) $V_1$, an outer wheel speed $V_2$, a cornering radius "R" of the inner wheels 612, and an axle length "t."

In accordance with basic geometry, the instantaneous turning radius "R" for an inner wheel 612 is calculated as:

$$V_1/R = V_2/(R+t).$$

An instantaneous lateral acceleration "a" of a trailer is estimated at its center of gravity as:

$$a = ((V_1+V_2)/2)^2/(t/(V_2/V_1-1)).$$

The ROP system then determines (see block 516) whether the estimated lateral acceleration exceeds a predetermined level (e.g., an alert mode entry level), which indicates an increased likelihood of an impending rollover. If the estimated lateral acceleration exceeds the alert mode entry level, the system is placed in an alert mode and a test braking pressure is applied (see block 520). Otherwise, the process stops (see block 522).

To apply the test pressure the ABS ECU 412 utilizes the wheel-end modulator valves 420 (see FIG. 4) to pulse the inner wheels 612 and place the outer wheels 614 in a "hold mode." The term hold mode refers to a relatively light constant braking pressure (e.g., about 10 psi). The test pressure pressurizes the service-brake chambers 422 (see FIG. 4) of the inner wheels 612 to a level having a drag force that is not sufficient to brake a wheel actually in contact with the road surface, but is sufficient to cause a wheel which has lost contact with the road surface to approach lock-up. Therefore, the ECU 412 acts as a means for determining if any of the wheels is not in contact with a driving surface. As the vehicle approaches roll-over, the inner wheels 612 have less and less contact with the road surface.

Since the normal open-loop control of the brake chamber may be inaccurate, service-brake chamber pressure sensors 440 (see FIG. 4) are utilized in one embodiment for providing feedback so that the ABS ECU 112 (see FIG. 2) may closely control the test pressure level. While the system is in the alert mode, the test pressure is applied and, at a decision block 524, the speed of the inner wheel 612 (see FIG. 6) is continuously checked for an impending lock-up. This alert mode state of control remains in effect unless the lateral acceleration drops below an alert mode exit level, which is lower than the alert mode entry level to provide a safe band and which causes the process to stop (see block 522).

If the inner wheels 612 (see FIG. 6) begin to lock (see the block 524) after the application of the test pressure, which indicates that the vehicle is beginning to rollover, the algorithm proceeds to an automatic intervention state of control. During the automatic intervention state, the ROP system interrupts the operator's control and commences an emergency stop. To achieve an emergency stop, the wheel-end modulator valves on both sides of the vehicle are de-energized and the traction control valve diverts full pressure from the air supply reservoir to the service-brake chambers (see block 526). This reduces the vehicle's speed, which results in decreased lateral acceleration and reduced lateral tire forces, which are the primary causes of rollover.

The full brake application is briefly maintained until the vehicle's speed is reduced and either the estimated lateral acceleration or the sensed lateral acceleration drops below an automatic intervention mode exit level (see block 530). Thereafter, ROP system control is relinquished and normal operator controlled braking is restored (see block 522).

The above-described ROP algorithm was tested with a computer simulation. The objective of the simulations was to implement the ROP algorithm in a conventional trailer ABS environment. A rollover intervention situation was chosen to include a tractor-trailer combination having trailer based ROP. The simulated operator of the model tried to negotiate the vehicle through a 100 m radius turn at 85 km/h. Computations were utilized to simulate the behavior of the ABS wheel-end modulator valves. Previously collected road test data provided the basis for the boundary conditions and settings of the model.

The computer simulation revealed that the ROP system behaved similarly to EBS based ROP systems. Due to the time lag during which the brake chambers are pressurized through the pneumatic lines to the traction valve, the relay valve, and the wheel-end modulator valve line (rather than through the electrically actuated EBS pressure control modules), the commencement of emergency braking was somewhat slower relative to an EBS based ROP system. On the other hand, the trailer-based ROP system of the present invention responded more quickly relative to a tractor-based ROP system, presumably because of a time lag for the tractor's trailer control valve command to reach the back of the trailer.

Figure 7:
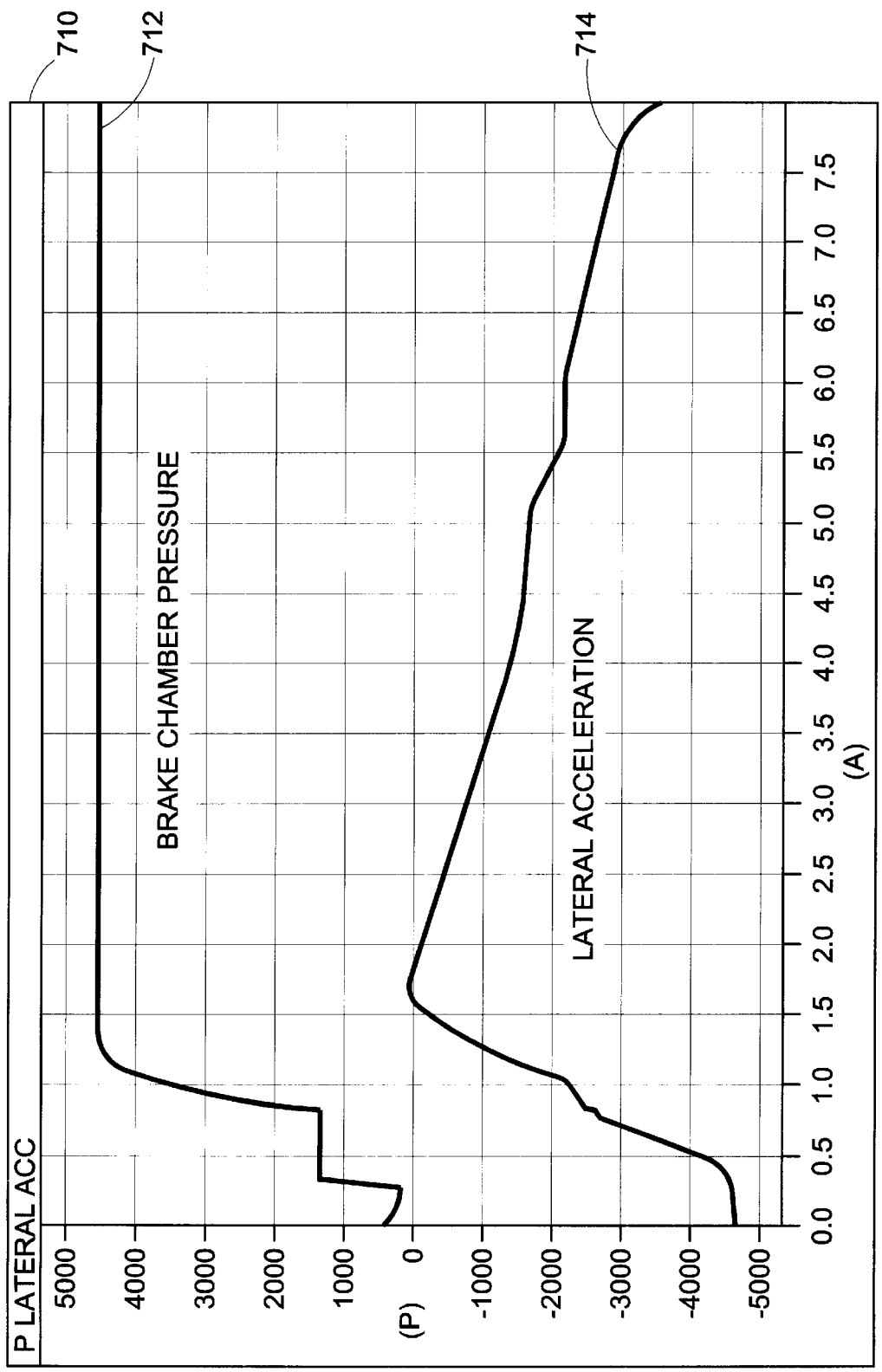
FIG. 7 is a graph of brake chamber pressure and lateral acceleration vs. time during a computer simulated ROP intervention in accordance with one embodiment of the present invention.

Illustrated in FIG. 7 is a graph 710 of brake chamber pressure "p" 712 and lateral acceleration 714 vs. time (seconds) for the ROP system 410 (see FIG. 4) during a simulated rollover intervention. Initially, the system is placed in the alert mode, and the brake chamber pressure "p" is regulated to about 1.3 bars (the test pressure) to test for a rollover condition. This is evident in the brake chamber pressure graph 712 between 0.25 s and 0.80 s on the time scale. However, the graph 714 indicates the lateral acceleration continues to increase. Furthermore, the system is placed in automatic intervention mode and automatic full brake application commences at about 1.15 s on the time scale of the graph 714 in response to a detected impending wheel lock-up of an inner wheel.

It is expected that a human operator would decelerate a vehicle once recognizing that an automatic ROP intervention was taking place. In this respect, the human operator would behave differently than the simulated operator. Because the simulated operator was not programmed to behave like a human operator, the initial turning radius and speed were maintained. As a result, the high lateral acceleration decreases relatively slowly (see the graph 714) in the model during automatic braking intervention.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A rollover prevention system for a vehicle including a tractor and a trailer, comprising:
    an antilock braking system including an electronic control unit and a plurality of wheel-end modulator valves associated with respective wheels;
    a lateral acceleration estimator, communicating with the electronic control unit, for determining a lateral acceleration of the vehicle; and
    a traction valve in the trailer, controlled by the electronic control unit, for transmitting a compressed fluid from a supply reservoir to the wheel-end modulator valves, as a function of the lateral acceleration of the vehicle, for applying braking pressures to the respective wheels.

2. The rollover prevention system for a vehicle as set forth in claim 1, wherein the wheel-end modulator valves cause a pulsed braking pressure to be applied to the wheels having less than a predetermined level of frictional contact with the driving surface if the lateral acceleration of the vehicle is greater than a predetermined entry level.

3. The rollover prevention system for a vehicle as set forth in claim 1, wherein:
the wheels are at opposed ends of an axle; and
the electronic control unit determines the lateral acceleration as a function of respective velocities of the wheels and a distance between the wheels along the axle.

4. The rollover prevention system for a vehicle as set forth in claim 3, wherein if the lateral acceleration exceeds a predetermined entry level:
one of the opposed wheels is associated with an inner turning curvature of the vehicle and another one of the opposed wheels is associated with an outer turning curvature of the vehicle; and
one of the wheel-end modulator valves applies a pulsed braking pressure to the inner wheel.

5. The rollover prevention system for a vehicle as set forth in claim 4, wherein if the inner wheel locks in response to the pulsed braking pressure, the electronic control unit causes the traction valve to transmit the compressed fluid from the supply reservoir to the wheel-end modulator valves for applying the braking pressures to the respective wheels for slowing a rotational rate of the wheels.

6. The rollover prevention system for a vehicle as set forth in claim 5, wherein the electronic control unit causes the traction valve to transmit the compressed fluid from the supply reservoir for applying the braking pressures to the respective wheels until the lateral acceleration of the vehicle is less than a predetermined exit level.

7. The rollover prevention system for a vehicle as set forth in claim 1:
further including a double check valve, including:
a first input receiving the compressed fluid from the traction valve;
a second input receiving a second compressed fluid representing an operator's braking demand, and;
an output communicating with the wheel-end modulator valves;
wherein the compressed fluid and the second compressed fluid have respective pressures; and
wherein whichever one of the compressed fluid and the second compressed fluid having the higher pressure is transmitted from the output to the wheel-end modulator valves.

8. The rollover prevention system for a vehicle as set forth in claim 1 wherein the fluid is air.

9. An apparatus for avoiding a rollover event of a vehicle, including a tractor and a trailer, having an axle, a plurality of opposed wheels, and a plurality of modulator valves associated with respective ones of the wheels and respective wheel brake chambers, the apparatus comprising:
means for determining a lateral acceleration of the vehicle;
means for determining if any of the wheels is not in contact with a driving surface, the wheel-end modulator valves causing respective braking pressures to be applied at the wheel brake chambers if any of the wheels is not in frictional contact with the driving surface and the lateral acceleration of the vehicle exceeds a predetermined entry level; and
means for supplying an adequate pressure to the modulator valves of the trailer for slowing a rotational speed of the wheels in frictional contact with the driving surface if at least one of the lateral acceleration of the vehicle is above a predetermined alert mode entry level and any of the wheels is not in contact with the driving surface.

10. The apparatus for predicting a rollover event of a vehicle as set forth in claim 9, wherein the lateral acceleration "a" of the vehicle is determined according to:

$$a=((V_1+V_2)/2)2/(t/(V_2/V_1-1));$$

where:
$V_1$=a speed of one of the opposed wheels;
$V_2$=a speed of another of the opposed wheels; and
t=a length of the axle between the opposed wheels.

11. The apparatus for predicting a rollover event of a vehicle as set forth in claim 9, wherein:
the means for determining if any of the wheels is not in frictional contact with the driving surface sets an alert mode if the estimated lateral acceleration exceeds the predetermined alert mode entry level; and
during the alert mode, the means for determining if any of the wheels is not in frictional contact with the driving surface causes a pulsed braking test pressure to be applied to the inner wheels via the respective modulator valves.

12. The apparatus for predicting a rollover event of a vehicle as set forth in claim 11, wherein, during the alert mode, the means for determining if any of the wheels is not in frictional contact with the driving surface causes a constant braking test pressure to be applied to the outer wheels via the respective modulator valves.

13. The apparatus for predicting a rollover event of a vehicle as set forth in claim 12, wherein the means for determining if any of the wheels is not in frictional contact with the driving surface terminates the alert mode if the lateral acceleration becomes less than an alert mode exit level.

14. The apparatus for predicting a rollover event of a vehicle as set forth in claim 11, wherein the means for determining if any of the wheels is not in frictional contact with the driving surface causes automatic braking pressures to be applied to all of the wheels via the respective modulator valves for decelerating the vehicle as a function of whether the pulsed braking test pressure causes the inner wheel to lock.

15. The apparatus for predicting a rollover event of a vehicle as set forth in claim 14, wherein the means for determining if any of the wheels is not in frictional contact with the driving surface causes the automatic braking pressures to stop being applied to all of the wheels when the lateral acceleration is less than an automatic intervention mode exit level.

16. The apparatus for predicting a rollover event of a vehicle as set forth in claim 9, wherein the vehicle is at least one of a heavy duty truck, tractor, trailer, or tractor-trailer combination.

17. The apparatus for avoiding a rollover event as set forth in claim 9, further including:
means for selecting a higher one of a pressure from the means for supplying and a pressure from an operator braking demand, the higher one of the pressures being transmitted to the wheel-end modulator valves if at least one of the lateral acceleration of the vehicle is above the predetermined alert mode entry level and any of the wheels is not in contact with the driving surface.

18. A method for preventing a rollover of a vehicle, including a tractor and a trailer, having an antilock braking system, the method comprising:

calculating a lateral acceleration of the vehicle;

if the lateral acceleration exceeds a predetermined alert mode entry level, setting an electronic control unit to be in an alert mode;

during the alert mode, applying a test pressure to a plurality of wheels on the vehicle;

monitoring respective velocities of the wheels for determining if any of the wheels is in a lockup condition; and if the lockup condition is detected for any of the wheels, transmitting a signal from the electronic control unit to a traction valve in the trailer for passing an air pressure from a compressed air reservoir to respective service brake chambers associated with the wheels, via the traction valve, to apply a braking pressure to the wheels.

19. The method for preventing a rollover as set forth in claim 18, wherein the calculating includes:

monitoring velocities of opposed wheels along an axle of the vehicle length.

20. The method for preventing a rollover as set forth in claim 19, wherein the applying includes:

pulsing a braking pressure to one of the opposed wheels and applying a constant braking pressure to the other of the opposed wheels.

21. The method for preventing a rollover as set forth in claim 18, further including:

if the lateral acceleration drops below an alert mode exit level, setting the electronic control unit to not be in the alert mode.

22. The method for preventing a rollover of a vehicle as set forth in claim 18, further including:

selectively applying a higher one of the air pressure from the compressed air reservoir and a pressure from an operator braking demand to service brake chambers associated with the wheels if the lockup condition is detected for any of the wheels.

23. An antilock braking system, comprising:

an electronic control unit;

a lateral acceleration estimator for determining a lateral acceleration of the vehicle; and a traction valve in a trailer of a vehicle, the electronic control unit causing the traction valve to apply compressed air from a supply reservoir to brake chambers of respective wheels of the vehicle as a function of the lateral acceleration of the vehicle and a level of frictional contact between the wheels and a driving surface.

24. The antilock braking system as set forth in claim 23, wherein the further including:

a plurality of wheel-end modulator valves communicating with the electronic control unit for causing the braking pressures to be applied at the respective wheels.

25. The antilock braking system as set forth in claim 23, wherein if the electronic control unit determines one of the wheels locks in response to a pulsed braking pressure, the electronic control unit causes braking pressures to be applied to the respective wheels for slowing a rotational rate of the wheels until the lateral acceleration estimator determines the lateral acceleration of the vehicle is less than a predetermined level.

* * * * *